INVENTORS
ROBERT D. TRIPLETT
TERRY J. LAUE

ATTORNEYS

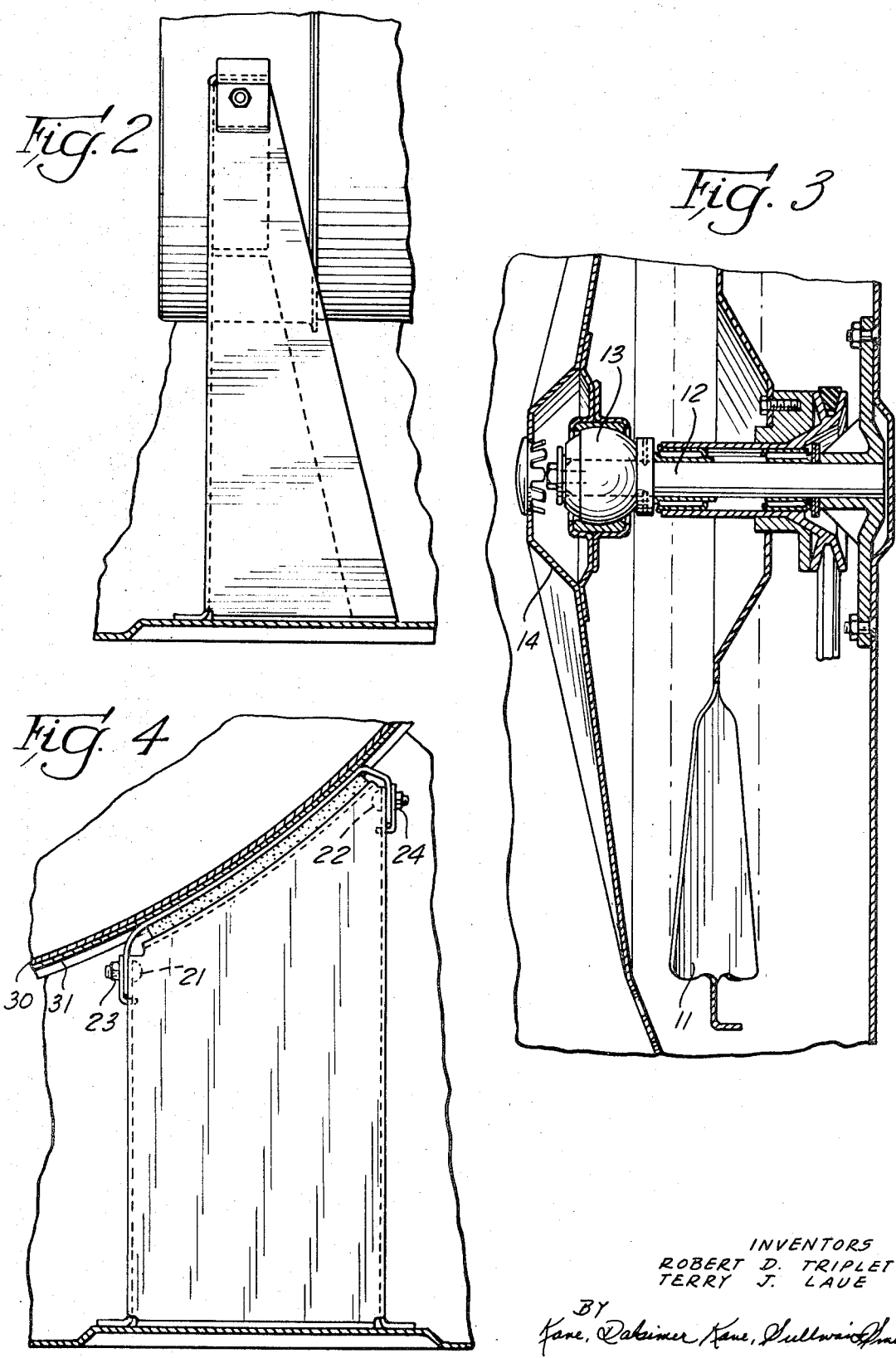

United States Patent Office 3,567,297
Patented Mar. 2, 1971

3,567,297
BEARING SURFACES WITH IMPROVED LUBRICATING CHARACTERISTICS
Robert D. Triplett and Terry J. Laue, Effingham, Ill., assignors to Fedders Corporation, Edison, N.J.
Filed May 15, 1969, Ser. No. 825,000
Int. Cl. B44c 1/04; F16c 27/00
U.S. Cl. 308—238
18 Claims

ABSTRACT OF THE DISCLOSURE

A first mating bearing surface is prepared as a pad combining carbon, preferably graphite, with a lubricating synthetic polymer. The opposing bearing surface is coated with a resinous paint so cured as to have a multitude of vortex cells. As the bearing surfaces run against each other, the carbon-lubricating synthetic polymer mixture is transferred, in part, to the vortex structure of the mating surface so as to provide a physically bonded lubricant, of the same composition, which bears against the first surface from which the lubricant was transferred.

BACKGROUND OF THE INVENTION

The lubricating effect of a polytetrafluoroethylene surface has long been known in the art and the material has been extensively used for this purpose. It had also been found that polytetrafluoroethylene had a tendency to transfer onto an adjacent running surface during operation of machinery employing it. However, this property has not been heretofore employed in such a manner as to provide for a controlled transfer of the polytetrafluoroethylene onto a painted surface.

In many bearing applications, one of the surfaces is on a relatively heavy body and this body rests upon the mating bearing surface. Such a situation is found with a horizontal rotatable drum, such as is found, for example, on a clothes dryer. The outer surfaces of these drums are generally provided with a resinous paint which is both smooth and resistant to heat. Attempts to transfer polytetrafluoroethylene to such a surface in order to provide a lubricating effect have been unsuccessful. The smooth surface of the painted drum does remove the polytetrafluoroethylene from the adjacent bearing surface, but the removed polymer does not adhere to the smooth, painted surface, and the result is an erosion of the mating surface of polytetrafluoroethylene, without the benefits of lubrication or long life.

The bearing systems employed by the prior art generally use a porcelain painted surface bearing against an adjacent hard surface. Such a system was generally fragile.

SUMMARY OF THE INVENTION

In accordance with the present invention it has unexpectedly been discovered that if one of two mating bearing surfaces is provided with a resinous coating having vortices, and the second bearing surface is formed of polytetrafluoroethylene, the polytetrafluoroethylene will transfer to the adjacent surface in a controlled manner, will adhere to that second surface, and will provide, in effect, two mating surfaces of lubricating polytetrafluoroethylene.

More particularly, it has unexpectedly been discovered that if one surface of a bearing is provided with a mixture of polytetrafluoroethylene and carbon, preferably graphitic carbon, and the mating surface is one formed from a synthetic polymeric paint coating, that this painted surface can be formed in such a manner as to provide for the controlled transfer of polytetrafluoroethylene and physical impregnation of the polytetrafluoroethylene in the surface. For example, with a clothes dryer having a relatively heavy, rotatable drum, the outer surface of this drum can be coated with a synthetic polymeric paint. With a proper formulation in curing of this paint, vortices can be formed in the surface. A plurality of vortices are formed and these take the pattern, in enlargement, of an alligator hide, as are illustrated in FIGS. 3, 4, 5, 6 and 9 of a paper entitled "Physical Chemistry of Paint Coatings—A Constant Search." This is a paper presented at the 1956 Joseph J. Mattiello Memorial Lecture at the 34th Annual Meeting of the Federation of Paint and Varnish Production Clubs in Cincinnati, Ohio on Oct. 22, 1956 by Maurice Van Loo, Director of Paint Research for the Sherwin-Williams Company.

These vortices act, in a controlled manner, to remove some of the polytetrafluoroethylene-carbon mixture from the mating surface and this polytetrafluoroethylene-carbon mixture is firmly bonded into the painted surface through the agency of the vortices.

The vortices can be formed, for example, by a controlled curing of the synthetic polymeric paint applied to the outer surface of the drum. For example, it has been found that gradual curing of certain painted surfaces, as opposed to rapid curing of those surfaces, results in a smooth ptainted surface, which is not effective to provide the self-lubricating bearing of the present invention. It would appear that the rapid curing, with the rapid evolution of solvent in those cases, causes the formation of a plurality of vortices which are permanently formed in the painted surface after the initial curing operation. Epoxy and acrylic paints have been found particularly advantageous in this application.

It is thus an object of this invention to provide a bearing having a controlled degree of transfer of polytetrafluoroethylene to provide for a self-lubricating bearing.

It is a further object of the present invention to provide a self-lubricating bearing for a clothes dryer, with the bearing having a controlled degree of transfer of a mixture of polytetrafluoroethylene and carbon to a painted surface formed with vortex cells.

DESCRIPTION OF THE DRAWINGS

In the accompanying drawings:
FIG. 2 is a view along the line A—A of FIG. 1, showing a portion of one of the bearing surfaces;
FIG. 3 is a view along the line B—B of FIG. 1 showing the opposite support for the dryer drum;
and
FIG. 4 is an enlarged view, in section, showing the adjacent bearing surfaces.

DESCRIPTION OF THE PREFERRED EMBODIMENTS

Figure 1:
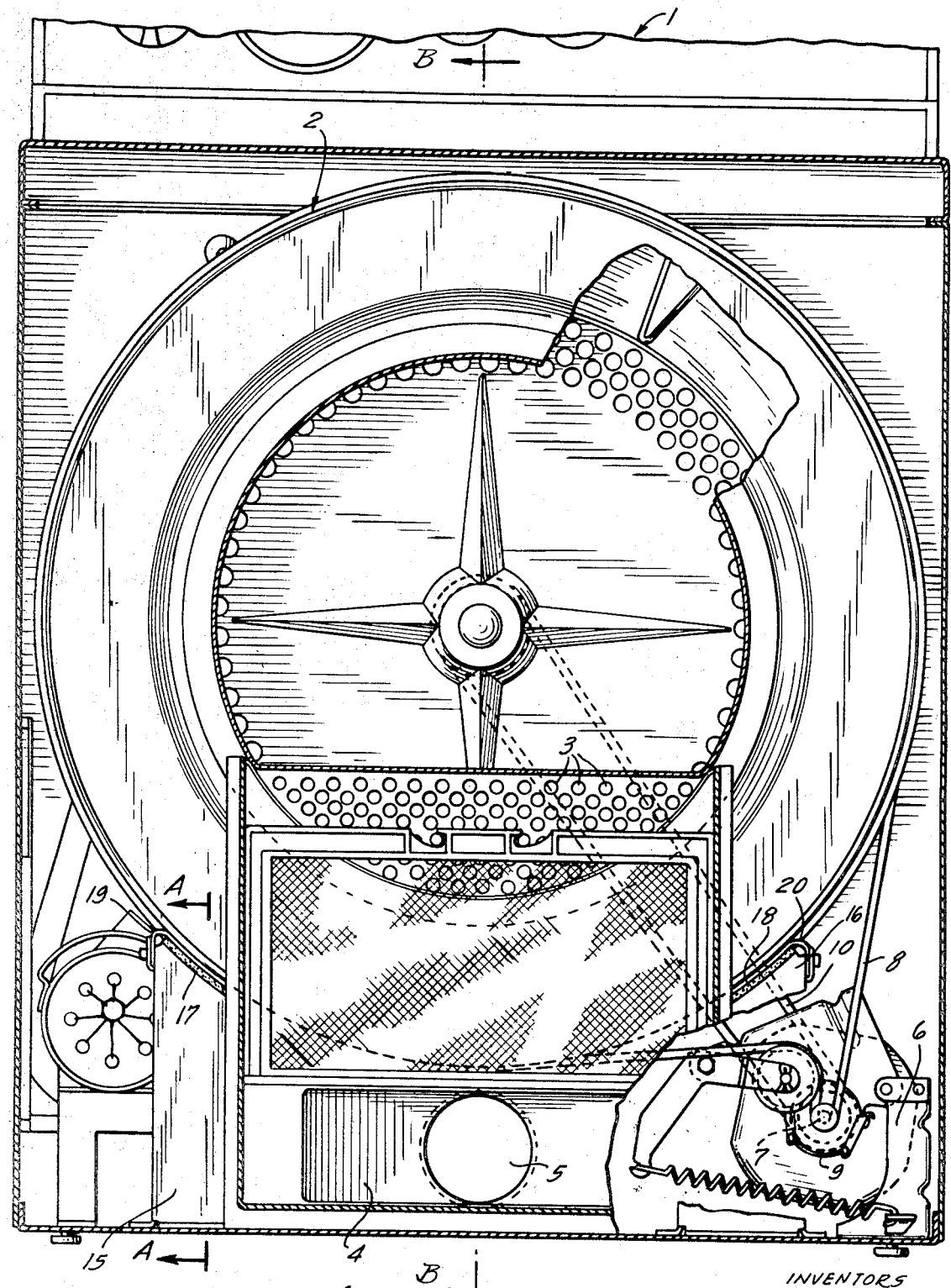
FIG. 1 is a front view, in section, of a clothes dryer.

Referring to the accompanying drawings, a clothes dryer 1 is shown having a rotatable drum 2. This drum 2 is provided, internally, with a series of apertures 3, which allow for the escape of the vaporized water, in the case of a clothes dryer. The clothes dryer is also provided with a transition duct 4 and exhaust duct 5 which provide for exhausting of the vaporized water. It should, of course, be recognized that this apparatus, with certain modifications, can also be employed in other applications employing a drum rotatable about a horizontal axis.

The drum is driven through the agency of motor 6 acting through pulley 7 on drive belt 8. A second pulley 9 acts through belt 10 to drive blower fan 11.

The dryer drum is supported, at the rear, through axle 12 and ball 13 in spider 14. The front support for the dryer drum is provided through pedestals 15 and 16. These pedestals are provided with lubricating pads 17 and 18 which are clamped to the upper arced surfaces of the pedestals through clamps 19 and 20. These clamps are affixed to the pedestals by any convenient joining means such as male threaded members 21 and 22, which are held by female threaded members 23 and 24.

The outer surface 30 of drum 2 is provided with a resinous paint coating 31, formed according to the present invention. This coating 31, because of the weight of the drum 2, bears against the lubricating pads 17 and 18.

As the resinous coatings employed are, in general, primer coatings, additional primer coatings are not needed. However, in order to provide sufficient strength, it has been found that two coats of the resinous coatings, applied and cured separately, are generally desirable. The coating 31 is applied to the surface in any standard manner and is then cured in such a way as to provide for the vortex cells according to the present invention. The painted surface thus formed is an open, cellular-like structure which, as previously mentioned, bears a resemblance, when magnified, to an alligator hide. The coating is formed in a controlled manner to provide these vortices, and this controlled manner is often a more rapid curing than would normally be employed.

The coating is, in general, a smooth surface with the indentations formed by the vortices. While the thickness of the surface is not critical, it is preferred that the minimum thickness be 1½ mils in order to provide sufficient penetration of the polytetrafluoroethylene-carbon mixture into the surface. There is no practical advantage to a coating which is more than 2½ mils thick. As mentioned, it is preferable that this thickness be provided with a plurality of coatings, rather than a single coating.

In general, because of the formulation characteristics of these materials, the resinous materials formed for commercial primer paint coatings can be employed in this application. For example, the epoxy coating can be formed from Finish 36–837 primer of the Jones-Dabney Division of Celanese Coatings Company. This primer is a mixture of an epoxy resin formed from epichlorohydrin and bisphenol A, in varying molecular weights, along with a minor proportion of melamine-formaldehyde resin carried in a solvent, such as a mixture of toluene or xylene with methyl ethyl ketone. This composition also contains a titanium dioxide pigment. The acrylic material can be Glidden Company #175 green acrylic primer which is a mixture of oil modified acrylics, melamine formaldehyde resins, and various stabilizers, along with a titanium dioxide pigment and the required solvents.

It is particularly advantageous if the ultimately applied and cured resinous paint coating has a pencil hardness between 4H and 6H. A softer resinous coating would be prematurely worn away, while high frequency chattering or squealing is experienced with harder resinous coating materials.

To show the effectiveness of the system described according to this invention, six panels, each having two coats of the epoxy resin system described above from Celanese Coating Company were formed. The conditions of curing are as set forth below:

| Surface coating number | First coat curing conditions | Second coat curing conditions |
| --- | --- | --- |
| 1 | 405° F. oven dried 15 minutes. | 405° F. oven dried 15 minutes. |
| 2 | do | 325–350° F. oven dried 15 hours. |
| 3 | 250° F. oven dried 16–18 hours. | 250° F. oven dried 16–18 hours. |

These coatings were formed on clothes dryer drums of the type shown in FIG. 1 and pads were formed, of the type designated 17 and 18 in the figures, of polytetrafluoroethylene containing 25%, by weight, of graphite.

Each of the drums was rotated at a surface speed of 370 feet per minute for 250 hours, while bearing against the polytetrafluoroethylene bearing surfaces. Following this test period, test sections were removed from each of the surfaces. The first drum, i.e., the one where each coating was cured at 405° F. for 15 minutes showed essentially no signs of wear but did show a smooth coating of polytetrafluoroethylene and graphite on the painted surface. This coating was uniformly impregnated into the vortices of the surface.

The second surface, i.e., the one in which the second coat was cured at 325–350° F. for 15 hours also had a coating of polytetrafluoroethylene and graphite impregnated into the surface. However, the coating was not as uniform and a slightly greater amount of the polytetrafluoroethylene-graphite pad had been removed during operation. With each of these two drums, the painted surface had a pencil hardness between 4H and 6H.

The last drum, i.e., the one in which each of the coatings had been cured at 250° F., showed an irregular surface and jagged pieces of epoxy resin coating embedded in the polytetrafluoroethylene. This showed the presence of the abrasive surface relative to the polytetrafluoroethylene, though the surface was actually smooth and without vortex cells. Additionally, various portions of the drum which bore on the polytetrafluoroethylene bearing surfaces were rubbed smooth, with most of the epoxy resin coating having been removed.

Results similar to those noted above were obtained employing an acrylic resin coating as previously described with the acrylic also having been cured in a controlled manner to produce the vortices and the required pencil hardness.

The amount of carbon which should be included in the polytetrafluoroethylene pad can range from about 15% to 30%. If too much carbon is employed, there is a potential problem with tensile strength of the pad. The preferred amount of carbon is approximately 25%. While a powdered, granular carbon can be employed, the preferred material is graphite.

In addition to polytetrafluoroethylene, other fluorine containing synthetic resins, such as polychlorotrifluoroethylene, etc. can be employed. With regard to this resinous paint coating, any of the synthetic resins which can be applied from a solvent system can be utilized. The coating is merely applied in a controlled manner, often at a high temperature with a short heating period, so that the vortices are formed in the surface. This will provide for a controlled transfer of the polytetrafluoroethylene-carbon mixture and thus provide the two adjacent bearing surfaces of polytetrafluoroethylene-carbon.

The bearing surfaces described according to this invention are capable of long wear. For example, such systems have been run at 370 surface feet per minute for a total of 150,000,000 surface feet without showing significant signs of wear.

We claim:
1. A bearing comprising:
   (a) a first surface formed of a lubricating fluorine-containing synthetic resin; and
   (b) a second surface formed by a rapid curing of a synthetic resinous paint having formed therein a series of vortex cells.
2. The bearing of claim 1 wherein a quantity of carbon is admixed with the fluorine-containing synthetic resin.
3. The bearing of claim 2 wherein the carbon is contained in an amount of from 15% to 30%, by weight, and is in the form of graphite.
4. The bearing of claim 1 wherein said first surface is formed of polytetrafluoroethylene.
5. The bearing of claim 4 wherein 25%, by weight, of graphite is admixed with the polytetrafluoroethylene.
6. The bearing of claim 1 wherein said synthetic resin is an epoxy resin.
7. The bearing of claim 4 wherein a melamine formaldehyde resin is admixed with the epoxy resin.

8. The bearing of claim 1 wherein said synthetic resin is an acrylic resin.

9. The bearing of claim 8 wherein a melamine formaldehyde resin is admixed with said acrylic resin.

10. A clothes dryer having a rotatable drum and pedestal supports for said drum, the improvement comprising forming the surfaces of said pedestal supports which are in contact with said rotatable drum of a lubricating synthetic resin and wherein the outer surface of said drum which contacts said pedestal supports is coated with a synthetic resin which, on curing, has a quantity of vortex cells.

11. The clothes dryer of claim 10 wherein a quantity of carbon is admixed with said lubircating synthetic resin.

12. The clothes dryer of claim 11 wherein said carbon is in the form of graphite and is contained in an amount of from 15% to 30%, by weight.

13. The clothes dryer of claim 10 wherein said lubricating synthetic resin is polytetrafluoroethylene.

14. The clothes dryer of claim 13 wherein a quantity of 25%, by weight, of graphite is admixed with the polytetrafluoroethylene.

15. The clothes dryer of claim 10 wherein said synthetic resinous paint is an epoxy resin.

16. The clothes dryer of claim 15 wherein a melamine formaldehyde resin is admixed with said epoxy resin.

17. The clothes dryer of claim 10 wherein said synthetic resinous paint is an acrylic resin.

18. The clothes dryer of claim 17 wherein a melamine formaldehyde resin is admixed with said acrylic resin.

References Cited

UNITED STATES PATENTS

| | | | |
|---|---|---|---|
| 2,275,239 | 3/1942 | Waldie | 117—41 |
| 2,862,835 | 12/1958 | Lederman | 117—41 |
| 3,134,686 | 5/1964 | Baechtold | 260—851 |
| 3,154,427 | 10/1964 | DeForrest et al. | 117—41 |
| 3,215,757 | 11/1965 | Sheibli et al. | 260—834 |
| 3,250,554 | 5/1966 | Roode | 308—238 |
| 3,319,012 | 5/1967 | Reed et al. | 179—100.2 |
| 3,342,667 | 9/1967 | Berlinghof, Jr. | 308—238 |
| 3,382,089 | 5/1968 | Klein et al. | 117—41 |

FRED C. MATTERN, Jr., Primary Examiner

W. S. RATLIFF, Jr., Assistant Examiner

U.S. Cl. X.R.

117—41